(12) United States Patent
Leusink (10) Patent No.: US 11,142,410 B2
(45) Date of Patent: Oct. 12, 2021

(54) GRIPPER APPARATUS

(71) Applicant: CSi Industries B.V., Raamsdonksveer (NL)

(72) Inventor: Hendrik Leusink, Raamsdonksveer (NL)

(73) Assignee: CSI INDUSTRIES B.V., Raamsdonksveer (NL)

( * ) Notice: Subject to any disclaimer, the term of this patent is extended or adjusted under 35 U.S.C. 154(b) by 244 days.

(21) Appl. No.: 16/474,778

(22) PCT Filed: Dec. 22, 2017

(86) PCT No.: PCT/NL2017/000020
§ 371 (c)(1),
(2) Date: Jun. 28, 2019

(87) PCT Pub. No.: WO2018/124876
PCT Pub. Date: Jul. 5, 2018

(65) Prior Publication Data
US 2019/0329990 A1      Oct. 31, 2019

(30) Foreign Application Priority Data

Dec. 30, 2016   (NL) ................................ 1042206

(51) Int. Cl.
*B65G 47/90*  (2006.01)
*B25J 15/02*  (2006.01)

(52) U.S. Cl.
CPC ........ *B65G 47/902* (2013.01); *B25J 15/0213* (2013.01)

(58) Field of Classification Search
CPC .. B65G 47/902; B65G 47/905; B25J 15/0213; B25J 15/026; B25J 15/083; B25J 15/022
See application file for complete search history.

(56) References Cited

U.S. PATENT DOCUMENTS 2,930,354 A      3/1960  Lockwood
3,312,370 A  *   4/1967  Kolarich ............ B23Q 3/15722
                                                            221/13
(Continued)

FOREIGN PATENT DOCUMENTS

DE     102011082211 A1    3/2013
EP         1596030 A2    11/2005
(Continued)

OTHER PUBLICATIONS

The International Search Report and Written Opinion in PCT Application PCT/NL2017/000020 dated Apr. 3, 2019.

*Primary Examiner* — Stephen A Vu
(74) *Attorney, Agent, or Firm* — Troutman Pepper Hamilton Sanders LLP; Ryan A Schneider (57) ABSTRACT

A gripper apparatus including a gripper frame and a gripper beak; an actuation mechanism for actuating the gripper beak; a clamping force generator biased to exert a clamping force on the gripper beak; a transmission mechanism including an input member that is vertically displaceable with respect to the gripper frame, wherein the transmission mechanism engages the actuation mechanism such that a high position of the input member corresponds to a closed position of the gripper beak while a downward displacement of the input member corresponds to a transition of the gripper beak to an open position; a vertically displaceable carrier coupling device that in a lower rest position presses down on the input member; and a latch mechanism, preferably of alternate push-push type, for holding the gripper beak in its open position.

16 Claims, 3 Drawing Sheets

(56) References Cited

U.S. PATENT DOCUMENTS

| | | | |
|---|---|---|---|
| 3,330,145 A * | 7/1967 | Adolphi | B21H 7/007 |
| | | | 72/274 |
| 5,947,880 A * | 9/1999 | Stagnitto | B25J 15/0491 |
| | | | 483/58 |
| 6,669,250 B1 | 12/2003 | St. Louis | |
| 7,152,892 B2 | 12/2006 | Rechberg | |
| 7,374,261 B1 | 5/2008 | Wang | |
| 7,793,995 B2 | 9/2010 | King et al. | |
| 2014/0227021 A1* | 8/2014 | Kamen | A61M 5/1414 |
| | | | 403/14 |
| 2016/0084434 A1* | 3/2016 | Janway | A61M 39/28 |
| | | | 361/601 |

FOREIGN PATENT DOCUMENTS

| | | |
|---|---|---|
| JP | 6025291 B1 | 11/2016 |
| WO | 2013073489 A1 | 5/2013 |

* cited by examiner

GRIPPER APPARATUS

FIELD OF THE INVENTION

In many areas, there is a need for a gripper apparatus, for picking, moving and placing an object. In general, a gripper apparatus comprises a gripper beak having at least two gripper jaws cooperating together. The gripper jaws can be pressed together for exerting a clamping force on an object. With the object clamped in the gripper beak, the apparatus can be displaced and hence displaces the object towards a destination location, where the object is placed by releasing the clamping force.

As an example, such gripper apparatus is useful as an implement attached to a robot arm, or to a drone, in conveying and/or stacking systems. As a particular area of interest, a palletiser for stacking boxes on a pallet is mentioned here.

BACKGROUND OF THE INVENTION

Gripper apparatuses of the above type exist. Typically, the gripper jaws are actuated by electric and/or pneumatic and/or hydraulic actuation systems. These systems involve problems.

For instance, in the case of a robot arm, the transfer of power from a stationary part to the moving arm constitutes a problem. In the case of a drone, hydraulics or pneumatics will not be practical; for the electric gripper, batteries will be needed which typically are heavy.

Further, safety is an issue. If the power supply fails, it is not acceptable if this would cause the object to fall from the gripper beak. This means that maintaining the gripping force should be able to be maintained with low or zero energy consumption.

Further, particularly for the case of a drone, the weight of the gripper apparatus should be as low as possible to be able to handle a payload with large weight.

SUMMARY OF THE INVENTION

The invention aims to overcome or at least reduce these problems. Particularly, the present invention aims to provide a gripper apparatus capable of operating without electric, pneumatic or hydraulic power source.

To this end, the present invention provides a gripper apparatus having a latch mechanism as specified in claim 1.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
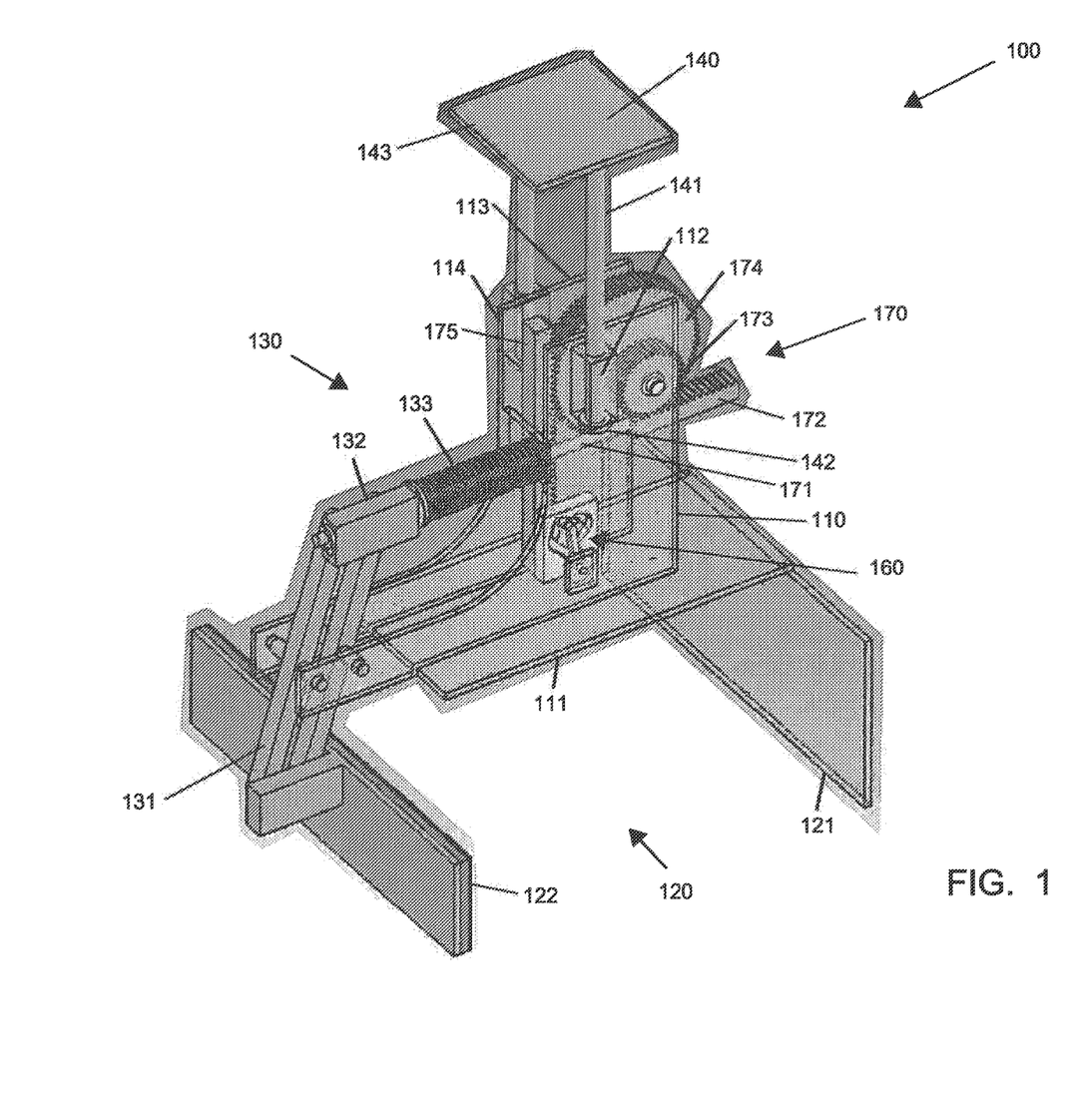
FIG. 1 is a schematic perspective transparent view of an embodiment of a gripper apparatus according to the present invention.

FIG. 1 schematically shows a gripper apparatus 100 in the normal orientation when in use. The gripper apparatus 100 comprises a gripper frame 110 and a gripper beak 120. The gripper beak 120 in this embodiment comprises two gripper jaws 121, 122 which can be pressed together for exerting a clamping force on an object (not shown). In this embodiment, a first one 121 of said gripper jaws is a stationary jaw, fixed with respect to the gripper frame 110, while a second one 122 of said gripper jaws is a movable jaw, movable with respect to the gripper frame 110. In other embodiments, two or more gripper jaws may be movable.

As will be explained in more detail, this embodiment of gripper apparatus 100 is suitable for being suspended from a drone or robot arm and for gripping an object from above, for which reason the gripper jaws 121, 122 are mounted under the gripper frame 110. This embodiment of gripper apparatus 100 is intended for lifting/moving/placing cube-shaped boxes. The gripper frame 110 comprises a horizontal resting plate 111 that in use will rest on the upper surface of the box to be lifted/placed. The first gripper jaw 121 has a plate-shaped configuration, and extends vertically down at right angles with respect to the resting plate 111, allowing to place a box very close to its neighbours on a pallet. Likewise, the second gripper jaw 122 has a plate-shaped configuration: the plate-shaped configuration of the two gripper jaws 121, 122 allows to distribute a relatively large gripping force over a relatively large box area to reduce gripping pressure and hence avoid or reduce deformation of the object to be gripped.

The gripper apparatus 100 further comprises a mechanical jaw actuation mechanism 130 for actuating the movable jaws, in this case the second jaw 122. The movable jaw(s) should move in horizontal direction, or in any case in a direction with a horizontal component, in order to open or close the gripper beak 120. The movable second jaw 122 has two extreme positions, i.e. an open position in which the distance to the fixed first jaw 121 is relatively large and a closed position in which the distance to the fixed first jaw 121 is relatively small. The horizontal distance between these two extreme positions will be indicated as jaw stroke. It is desirable that the jaw stroke is as large as possible, in order to be able to grip boxes of varying sizes in a size range as large as possible.

The gripper apparatus 100 further comprises a latch mechanism 160 for holding the jaw actuation mechanism 130 and hence the movable second jaw 122 in its open position, as will be explained in more detail later.

In the exemplary embodiment shown, the jaw actuation mechanism 130 comprises a lever 131 hinged to the gripper frame 110. The movable second jaw 122 is connected to one end of the lever 131; at an opposite end of the lever 131, a support block 132 is connected. The hinge point of the lever with respect to the gripper frame 110 is located approximately midway of the length of the lever. In the embodiment shown, the lever 131 is a double-arm lever that has a parallelogram configuration in order to always hold the second jaw 122 is vertical orientation, which is preferred but not essential.

The jaw actuation mechanism 130 further comprises a clamping force generator 133 biased to exert a clamping force on the movable second jaw 122 urging the movable second jaw 122 towards its closed position. In the exemplary embodiment shown, the clamping force generator 133 comprises a helix spring supporting at one end (the righthand end in FIG. 1) against the gripper frame 110 and supporting at the opposite end (the lefthand end in FIG. 1) against the support block 132. When the second jaw 122 is opened, the spring 133 is compressed. If released, the spring 133 pushes the support block 132 away, and via the lever 131 the movable second jaw 122 is pushed towards the first jaw 121.

If a box (or other object) is placed in the gripper beak 120, the movable second jaw 122 engages the box, if necessary displacing the box until it supports against the fixed first jaw 121, at which point the second jaw 122 can move no further but keeps pushing against the box, caused by the spring 133 which is trying to expand.

It will be clear that instead of or in addition to a "pushing" spring it is also possible to use a suitably mounted "pulling" spring.

Further, it will be clear that other implementations for the clamping force generator 133 are possible, for instance an elastically deformable "solid" body such as a block of rubber, or for instance a gas-filled cylinder/piston combination. It is even possible to use electrically activated mechanisms, but the non-electric examples mentioned, indicated as "passive" or "elastic" actuators, provide the important advantage that they can operate virtually indefinitely without requiring any power supply such as a battery and without the risk of getting out of operation due to exhaustion of such power supply.

The gripper apparatus 100 further comprises a carrier coupling device 140 for coupling with a carrier device. As mentioned, such carrier device may for instance involve a robot arm or a drone. Taking the drone as an example, the carrier coupling device 140 will be attached to the underside of the drone, for instance directly to the drone body or to a hoisting mechanism of the drone. It is preferred that the carrier coupling device 140 be attached to the drone body directly, so that the gripper apparatus 100 becomes part of the drone, yet it is further preferred to include a ball coupling or a universal joint coupling to allow the gripper apparatus 100 to always maintain a vertical orientation irrespective of the precise orientation of the drone.

It is a particular aspect of the present invention that, with respect to the gripper frame 110, the carrier coupling device 140 is vertically displaceable between two extreme positions. In the embodiment shown, the carrier coupling device 140 comprises at least one (the exemplary embodiment has two) carrier rod 141 extending vertically downward, and the gripper frame 110 comprises a guide block 112 for each carrier rod 141. The guide block 112 has a vertical through hole through which the carrier rod 141 extends. Below the guide block 112, preferably at its lower free end, the carrier rod 141 has a stop portion 142 having a wider transverse size as compared to the carrier rod 141, and wider than the vertical through hole of the guide block 112.

When the carrier device lifts the gripper apparatus 100, first the carrier coupling device 140 will be lifted with respect to the gripper frame 110, until the stop portion 142 contacts a lower surface of the guide block 112. This defines an upper extreme position of the carrier coupling device 140, which will be indicated as the "lifting position". When lifted further, the carrier coupling device 140 will lift the gripper frame 110.

When the carrier device places the gripper apparatus 100 on a supportive surface and releases the lifting force, the carrier coupling device 140 will be lowered with respect to the gripper frame 110, until the carrier coupling device 140 contacts a second stop that defines a lower extreme position of the carrier coupling device 140, which will be indicated as the "rest position". Said second stop may be constituted by the resting plate 111, which is contacted by the lowest extreme end of the carrier rod 141. Said second stop may also be constituted by an upper surface of the guide block 112, or by a frame portion located at a higher level that the upper surface of the guide block 112, which is contacted by another wider portion of the carrier rod 141 or by another part of the carrier coupling device 140. In the exemplary embodiment shown, the carrier coupling device 140 has a horizontal plate-shaped table portion 143 attached to an upper end of the carrier rod 141, which table portion 143 may contact an upper edge 113 of a vertically extending frame plate 114.

The vertical distance between the lifting position and the rest position will be indicated as "carrier stroke".

It is a particular aspect of the present invention that the carrier stroke is used for actuating the latch mechanism 160. The latch mechanism 160 has two operative states, indicated as lock state and release state respectively. In the release state of the latch, the lever 131 and hence the second jaw 122 can move freely, and will hence be forced towards the closed position under influence of the clamping force exerted by the clamping force generator 133. This will be the condition for lifting objects. In the case of a drone, this will be the condition when the drone is flying. In the lock state of the latch, the lever 131 and hence the second jaw 122 are in the open position and are prevented from moving towards the closed position; this will be the condition for applying the gripper to the object to be lifted, and for releasing the object from the gripper.

In principle, it is possible to have an embodiment where the operative state (release/lock) of the latch mechanism 160 is directly derived from the position (high/low) of the carrier coupling device 140 with respect to the gripper frame 110. However, when the carrier (for instance drone) lifts the carrier coupling device 140 to lift the gripper apparatus 100, this can either be for gripping and lifting the object or for releasing and leaving the object behind.

Therefore, in a preferred embodiment, the latch mechanism 160 is of a type receiving one-directional push-actuation, also indicated here as alternate push-push latch system or push-to-open latch. When receiving push-actuation for a first time, the latch mechanism 160 makes a transition from the release state to the lock state; when receiving push-actuation for a second time, the latch mechanism 160 makes a transition from the lock state to the release state. And so on.

It is noted that push-actuation is equivalent to pull-actuation.

Latch mechanisms of this type are known per se, for instance in ballpoints or in push-to-open cabinet doors or drawers. An early example is disclosed in U.S. Pat. No. 2,930,354 "alternate push rocking latch system", EP1596030 discloses a "silent push-push latch". Other examples of such systems are disclosed in U.S. Pat. Nos. 6,669,250, 7,152,892, 7,374,261, 7,793,995, 8,590,989, WO2013/073489. The present invention may be implemented with any of these, or other, types of latch mechanisms. Therefore a more detailed discussion of design and operation of the latch mechanism will be omitted here.

While the clamping force generator 133, with the latch mechanism 160 in its release state, will automatically close the gripper beak 120 and keep an object clamped in the gripper beak, it is necessary to apply a counterforce opposite to and of higher strength than the clamping force in order to open the gripper beak 120. It is a further particular aspect of the present invention that the carrier stroke is used for opening the gripper beak 120.

For this purpose, the gripper apparatus 100 further comprises a transmission mechanism 170 operated by the carrier coupling device 140 and engaging the jaw actuation mechanism 130, In the exemplary embodiment shown, the transmission mechanism 170 comprises a transmission rod 171 having one end attached to the support block 132. Conveniently the transmission rod 171 extends coaxially through the helix spring 133. At its opposite end, the transmission rod 171 is attached to a first gear rack 172.

The transmission rod 171 with the first gear rack 172 extends horizontally, and has freedom of movement (reciprocation) in its longitudinal direction. It has already been mentioned that the carrier rod(s) 141 have their freedom of movement (reciprocation) in their longitudinal direction, i.e. in vertical direction. For coupling the vertical movement of the carrier coupling device 140 to the horizontal movement of the support block 132, in the exemplary embodiment shown, the transmission mechanism 170 further comprises two coaxial gear wheels 173, 174, either attached to each other or formed as a single piece, mounted for rotation about an horizontal axis with respect to the gripper frame 110, A first one 173 of these gear wheels engages the first gear rack 172. A second one 174 of these gear wheels engages a second gear rack 175. The second gear rack 175 has its longitudinal extent directed vertically, and is mounted vertically displaceable with respect to the gripper frame 110.

It will be seen that this transmission mechanism 170 translates vertical displacement of the second gear rack 175 to horizontal displacement of the first gear rack 172, The arrangement is such that a downward movement of the second gear rack 175 corresponds to a horizontal movement of the first gear rack 172 in a direction against the clamping force of the spring 133. Preferably, as shown, the first gear wheel 173 has smaller diameter than the second gear wheel 174, so that a larger displacement of the second gear rack 175 is translated to a smaller displacement of the first gear rack 172 and consequently any downforce exerted by the second gear rack 175 on the second gear wheel 174 translates to higher force exerted by the first gear wheel 173 on the first gear rack 172, hence reducing the downforce required for overcoming the high clamping force of the spring 133.

It will be seen that the second gear rack 175, the second gear wheel 174, the first gear wheel 173, the first gear rack 172, the transmission rod 171, the support block 132, the lever 131 and the second gripper jaw 122 are all coupled together semi-rigidly, i.e. they all move together. Moving any one of these components will move all of these components, while blocking any one of these components will arrest all of these components. Consequently, the latch mechanism 160 may engage any one of these components. In the exemplary embodiment shown, the latch mechanism 160 engages the second gear rack 175.

As will be understood from the following explanation, the main function of the second gear rack 175 is a vertically displaceable follower for following the vertical displacement of the carrier coupling device 140. Other implementations of the follower will be possible, and other implementations for translating vertical displacement of the follower to horizontal displacement of the support block 132 will be possible. It is not necessary to have geared wheels 173, 174, and hence it is not necessary to have gear racks. It is for instance possible to use a drive rod mechanism. It is for instance possible to use an articulated arm design for direct coupling between follower 175 and transmission rod 171.

Also referring to FIGS. 2A-H, operation is as follows. Assume the second gear rack 175 (follower) is in a low position, the gripper beak 120 is in the open position, and the latch mechanism 160 is locked. The carrier coupling device 140 is lifted by a carrier (e.g. drone), to lift the entire gripper apparatus 100 [FIG. 2A]. The follower can not follow the carrier coupling device 140.

Figure 2A:
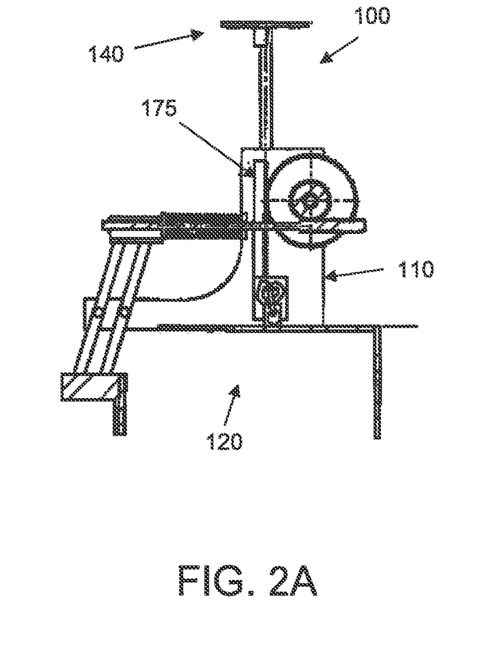
FIGS. 2A-H are schematic side views illustrating various stages of the operation of the gripper apparatus.
Figure 2B:
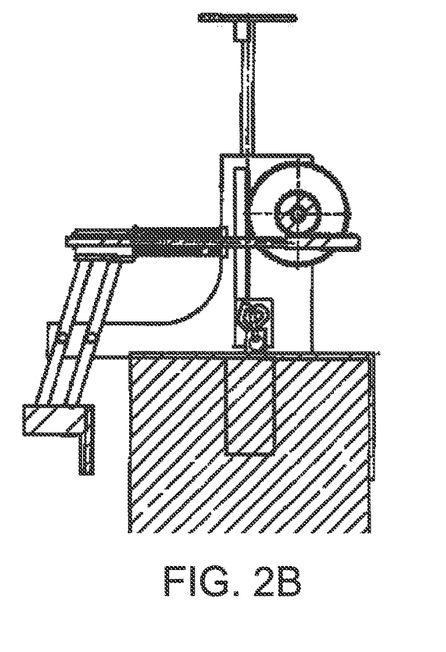

The gripper apparatus 100 is lowered onto a box [FIG. 2B].

The carrier device (e.g. drone) will now reduce lifting force. The weight of the carrier (e.g. drone) will then push down the carrier coupling device 140, which in turn pushes down the second gear rack 175 [FIG. 2C], The carrier coupling device 140 has an engagement portion for engaging the second gear rack 175, which engagement portion in the exemplary embodiment is constituted by the table portion 143.

Figure 2C:
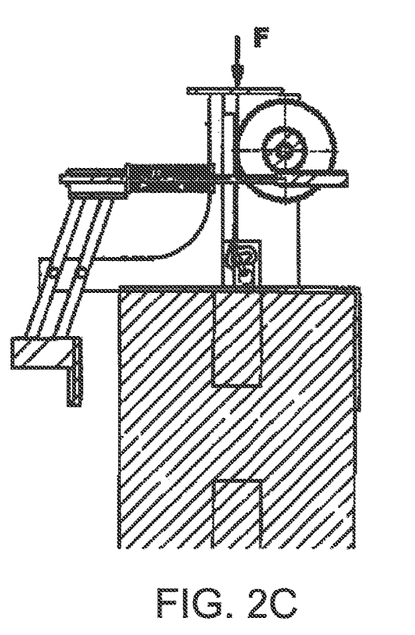

By pushing down the second gear rack 175, the latch mechanism 160 has been brought to its release state.

The carrier device (e.g. drone) will now increase lifting force. The carrier coupling device 140 will rise, and the second gear rack 175 will rise under influence of the force exerted by the spring 133: the follower follows the carrier coupling device 140. As the spring 133 expands, the gripper beak 120 is closed [FIG. 2D].

Figure 2D:
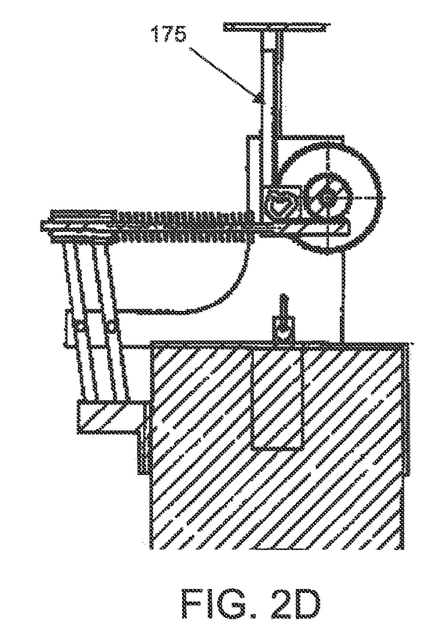

The latch mechanism 160 has now released the second gear rack 175, which will continue to move upwards following the upwards movement of the carrier coupling device 140. Simultaneously, the gripper beak 120 will be pushed close by the spring 133, firmly gripping the box to be lifted. The gripper beak 120 engages the box to be lifted and can not close further, hence the second gear rack 175 can not rise further. This happens before the carrier coupling device 140 reaches its lifting position, ensuring that the gripping force of the spring 133 is fully deployed.

Figure 2E:
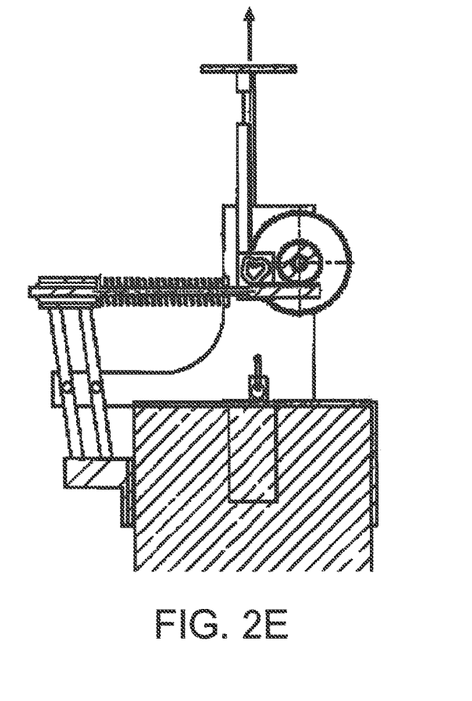
Figure 2F:
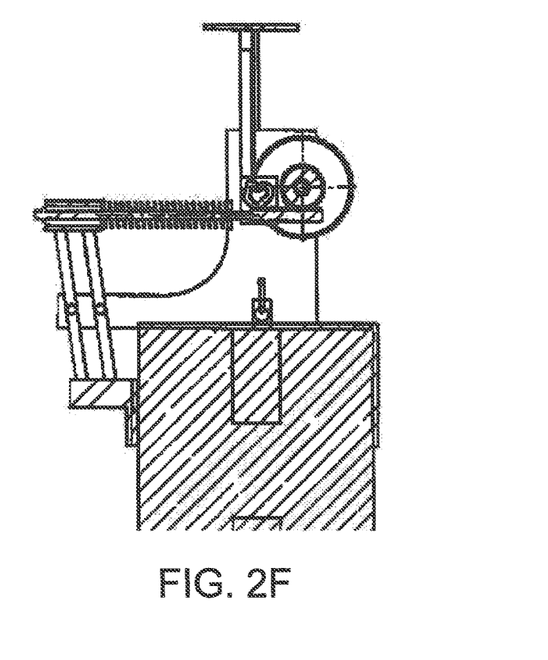
Figure 2G:
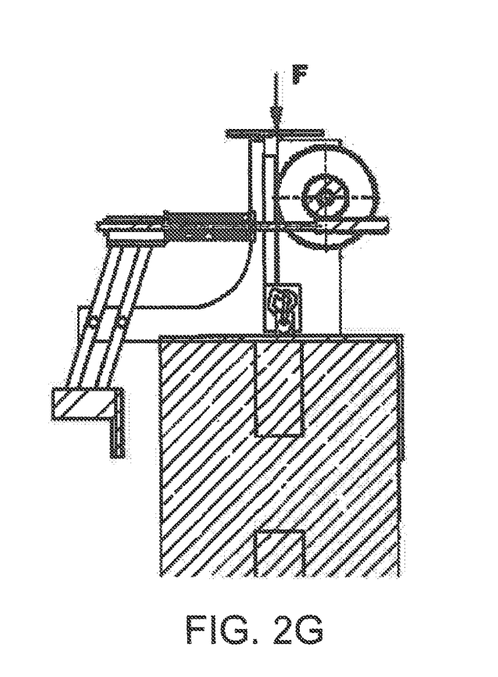
Figure 2H:
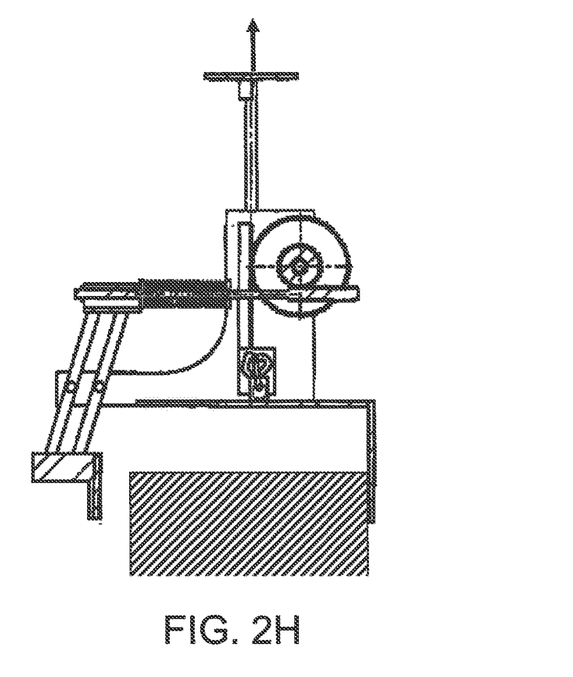

The carrier coupling device 140 is lifted further to reach its lifting position, and, when lifted further, the entire gripper apparatus 100 together with the clamped box is lifted [FIG. 2E].

The carrier device (e.g. drone) brings the gripper apparatus 100 together with the clamped box to the box's destination.

Having arrived at the destination, the carrier (e.g. drone) will place the box. For discharging the box, the carrier (e.g. drone) will again reduce its lifting force so that its weight pushes down the carrier coupling device 140. The carrier coupling device 140 has some free downstroke before engaging the second gear rack 175 [FIG. 2F].

The carrier device pushes down further, so that the carrier coupling device 140 pushes down the second gear rack 175: the follower again follows the carrier coupling device 140. As a result, the gripper beak 120 opens [FIG. 2G].

Finally, at the end of its downstroke, the latch mechanism 160 engages the transmission mechanism 170 or the jaw actuation mechanism 130 in its lock state. The carrier (e.g. drone) rises, lifting the carrier coupling device 140. The second gear rack 175 can not rise, because the latch mechanism 160 is locked, thus the gripper beak 120 stays open, and the gripper apparatus 100 is lifted while the box remains behind [FIG. 2H].

The carrier (e.g. drone) with the gripper apparatus 100 is immediately ready for picking up a next box. Each time the carrier (e.g. drone) pushes down, the gripper apparatus 100 alternates from the open condition to the closed condition or vice versa. No separate power supply is needed for gripping or releasing an object, apart from the power associated with the carriers weight. Further, as long as the box maintains its integrity, and as long as the force generator 133 does not break, the carrier can not inadvertently lose the box, because the box can only be released when placed on a support.

It is noted that, in stead of or in addition to the helix spring discussed, other types of force generators can also be used. For instance, a piston/cylinder combination will build up pressure when compressed and can hence exert a pressurebased force on the gripper jaw(s). It is also possible that the force generator is located at another position, and that the force generator engages any one of the components from second gear rack 175 to second gripper jaw 122 in view of the above-mentioned semi-rigid coupling between these components. For instance, it is possible that the force generator comprises a spiral spring located in one or more of the gear wheels 173, 174.

It should be clear to a person skilled in the art that the present invention is not limited to the exemplary embodiments discussed above, but that several variations and modifications are possible within the protective scope of the invention as defined in the appending claims. For instance, two or more functions may be performed by one single entity. Even if certain features are recited in different dependent claims, the present invention also relates to an embodiment comprising these features in common. Even if certain features have been described in combination with each other, the present invention also relates to an embodiment in which one or more of these features are omitted. Features which have not been explicitly described as being essential may also be omitted. Any reference signs in a claim should not be construed as limiting the scope of that claim.

The invention claimed is:

1. Gripper apparatus comprising:
   a gripper frame and a gripper beak including at least one moveable gripper jaw, the gripper beak having an open position and a closed position;
   a jaw actuation mechanism for selectively actuating the gripper beak to its open position or its closed position;
   a clamping force generator biased to exert a clamping force on the gripper beak urging the gripper beak towards its closed position;
   a transmission mechanism comprising an input member that is vertically displaceable with respect to the gripper frame, wherein the transmission mechanism engages the jaw actuation mechanism such that a high position of the input member corresponds to the closed position of the gripper beak while a downward displacement of the input member corresponds to a transition of the gripper beak to its open position;
   a carrier coupling device for coupling with a carrier device, which carrier coupling device, with respect to the gripper frame, is vertically displaceable between an upper lifting position and a lower rest position; and
   an alternate push-push latch mechanism coupled to a component of the transmission mechanism or to a component of the jaw actuation mechanism, the latch mechanism having a release state in which the transmission mechanism and the jaw actuation mechanism can move freely, and having a lock state in which the transmission mechanism and the jaw actuation mechanism are prevented from moving from the open position of the gripper beak to the closed position of the gripper beak, for holding the gripper beak in its open position.

2. The gripper apparatus according to claim 1, wherein:
   in the upper lifting position, the carrier coupling device is in lifting-force transferring engagement with the gripper frame;
   in the lower rest position, the carrier coupling device presses down on the input member of the transmission mechanism; and
   when the latch mechanism is in its locked state, the carrier coupling device is free to move upwards to its upper lifting position while the input member of the transmission mechanism is prevented from following the carrier coupling device and remains in a low position.

3. The gripper apparatus according to claim 2, wherein, when the latch mechanism is in its locked state and the input member of the transmission mechanism is in its low position and the gripper beak is in its open position, the carrier coupling device is free to move downwards to engage the input member of the transmission mechanism in its low position, and wherein subsequent downward and upward movement of the carrier coupling device will cause the latch mechanism to make a transition to its release state.

4. The gripper apparatus according to claim 2, wherein, when the latch mechanism is in its released state, the carrier coupling device is free to move upwards to its lifting position and the input member of the transmission mechanism under influence of the clamping force exerted by the force generator is caused to follow the carrier coupling device and reach its high position while simultaneously the clamping force exerted by the clamping force generator causes the gripper beak to make a transition to its closed position.

5. The gripper apparatus according to claim 2, wherein, when the latch mechanism is in its released state and the input member of the transmission mechanism is in its high position and the gripper beak is in its closed position, the carrier coupling device is free to move downwards to engage the input member of the transmission mechanism, wherein further downwards movement of the carrier coupling device forces the input member of the transmission mechanism downwards against the clamping force exerted by the force generator while simultaneously forcing the gripper beak to its open position, and simultaneously causing the latch mechanism to make a transition to its lock state.

6. The gripper apparatus according to claim 1, wherein, when the latch mechanism is in its locked state and the input member of the transmission mechanism is in its low position and the gripper beak is in its open position, the carrier coupling device is free to move downwards to engage the input member of the transmission mechanism in its low position, and wherein subsequent downward and upward movement of the carrier coupling device will cause the latch mechanism to make a transition to its release state.

7. The gripper apparatus according to claim 6, wherein, when the latch mechanism is in its released state, the carrier coupling device is free to move upwards to its lifting position and the input member of the transmission mechanism under influence of the clamping force exerted by the force generator is caused to follow the carrier coupling device and reach its high position while simultaneously the clamping force exerted by the clamping force generator causes the gripper beak to make a transition to its closed position.

8. The gripper apparatus according to claim 6, wherein, when the latch mechanism is in its released state and the input member of the transmission mechanism is in its high position and the gripper beak is in its closed position, the carrier coupling device is free to move downwards to engage the input member of the transmission mechanism, wherein further downwards movement of the carrier coupling device forces the input member of the transmission mechanism downwards against the clamping force exerted by the force generator while simultaneously forcing the gripper beak to its open position, and simultaneously causing the latch mechanism to make a transition to its lock state.

9. The gripper apparatus according to claim 1, wherein:
in the upper lifting position, the carrier coupling device is in lifting-force transferring engagement with the gripper frame;
in the lower rest position, the carrier coupling device presses down on the input member of the transmission mechanism; and
when the latch mechanism is in its released state, the carrier coupling device is free to move upwards to its lifting position and the input member of the transmission mechanism under influence of the clamping force exerted by the force generator is caused to follow the carrier coupling device and reach its high position while simultaneously the clamping force exerted by the clamping force generator causes the gripper beak to make a transition to its closed position.

10. The gripper apparatus according to claim 9, wherein the gripper beak reaches its closed position before the carrier coupling device reaches its lifting position.

11. The gripper apparatus according to claim 10, wherein, when the latch mechanism is in its released state and the input member of the transmission mechanism is in its high position and the gripper beak is in its closed position, the carrier coupling device is free to move downwards to engage the input member of the transmission mechanism, wherein further downwards movement of the carrier coupling device forces the input member of the transmission mechanism downwards against the clamping force exerted by the force generator while simultaneously forcing the gripper beak to its open position, and simultaneously causing the latch mechanism to make a transition to its lock state.

12. The gripper apparatus according to claim 9, wherein, when the latch mechanism is in its released state and the input member of the transmission mechanism is in its high position and the gripper beak is in its closed position, the carrier coupling device is free to move downwards to engage the input member of the transmission mechanism, wherein further downwards movement of the carrier coupling device forces the input member of the transmission mechanism downwards against the clamping force exerted by the force generator while simultaneously forcing the gripper beak to its open position, and simultaneously causing the latch mechanism to make a transition to its lock state.

13. The gripper apparatus according to claim 1, wherein, when the latch mechanism is in its released state and the input member of the transmission mechanism is in its high position and the gripper beak is in its closed position, the carrier coupling device is free to move downwards to engage the input member of the transmission mechanism, wherein further downwards movement of the carrier coupling device forces the input member of the transmission mechanism downwards against the clamping force exerted by the force generator while simultaneously forcing the gripper beak to its open position, and simultaneously causing the latch mechanism to make a transition to its lock state.

14. Robot arm comprising a gripper apparatus comprising:
a gripper frame and a gripper beak including at least one moveable gripper law, the gripper beak having an open position and a closed position;
a jaw actuation mechanism for selectively actuating the gripper beak to its open position or its closed position;
a clamping force generator biased to exert a clamping force on the gripper beak urging the gripper beak towards its closed position;
a transmission mechanism comprising an input member that is vertically displaceable with respect to the gripper frame, wherein the transmission mechanism engages the law actuation mechanism such that a high position of the input member corresponds to the closed position of the gripper beak while a downward displacement of the input member corresponds to a transition of the gripper beak to its open position;
a carrier coupling device for coupling with a carrier device, which carrier coupling device, with respect to the gripper frame, is vertically displaceable between an upper lifting position and a lower rest position; and
a latch mechanism coupled to a component of the transmission mechanism or to a component of the jaw actuation mechanism, the latch mechanism having a release state in which the transmission mechanism and the law actuation mechanism can move freely, and having a lock state in which the transmission mechanism and the law actuation mechanism are prevented from moving from the open position of the gripper beak to the closed position of the gripper beak, for holding the gripper beak in its open position.

15. Palletiser comprising a gripper apparatus comprising:
a gripper frame and a gripper beak including at least one moveable gripper law, the gripper beak having an open position and a closed position;
a jaw actuation mechanism for selectively actuating the gripper beak to its open position or its closed position;
a clamping force generator biased to exert a clamping force on the gripper beak urging the gripper beak towards its closed position;
a transmission mechanism comprising an input member that is vertically displaceable with respect to the gripper frame, wherein the transmission mechanism engages the law actuation mechanism such that a high position of the input member corresponds to the closed position of the gripper beak while a downward displacement of the input member corresponds to a transition of the gripper beak to its open position;
a carrier coupling device for coupling with a carrier device, which carrier coupling device, with respect to the gripper frame, is vertically displaceable between an upper lifting position and a lower rest position; and
a latch mechanism coupled to a component of the transmission mechanism or to a component of the jaw actuation mechanism, the latch mechanism having a release state in which the transmission mechanism and the law actuation mechanism can move freely, and having a lock state in which the transmission mechanism and the law actuation mechanism are prevented from moving from the open position of the gripper beak to the closed position of the gripper beak, for holding the gripper beak in its open position.

16. Drone comprising a gripper apparatus comprising:
a gripper frame and a gripper beak including at least one moveable gripper law, the gripper beak having an open position and a closed position;
a jaw actuation mechanism for selectively actuating the gripper beak to its open position or its closed position;
a clamping force generator biased to exert a clamping force on the gripper beak urging the gripper beak towards its closed position;
a transmission mechanism comprising an input member that is vertically displaceable with respect to the gripper frame, wherein the transmission mechanism engages the law actuation mechanism such that a high position of the input member corresponds to the closed position of the gripper beak while a downward displacement of the input member corresponds to a transition of the gripper beak to its open position;

a carrier coupling device for coupling with a carrier device, which carrier coupling device, with respect to the gripper frame, is vertically displaceable between an upper lifting position and a lower rest position; and a latch mechanism coupled to a component of the transmission mechanism or to a component of the jaw actuation mechanism, the latch mechanism having a release state in which the transmission mechanism and the law actuation mechanism can move freely, and having a lock state in which the transmission mechanism and the law actuation mechanism are prevented from moving from the open position of the gripper beak to the closed position of the gripper beak, for holding the gripper beak in its open position.

* * * * *